(12) United States Patent
Chang

(10) Patent No.: US 6,188,890 B1
(45) Date of Patent: Feb. 13, 2001

(54) PREVENTING WIRELESS TELECOMMUNICATIONS CALLS FROM BEING DISCONNECTED DUE TO LOW SIGNAL QUALITY

(75) Inventor: Shih-Jeh Chang, Naperville, IL (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 08/974,941

(22) Filed: Nov. 20, 1997

(51) Int. Cl.[7] .............................. H04B 17/00; H04B 1/38; H04M 11/00

(52) U.S. Cl. .................. 455/421; 455/421; 455/67.7; 455/575

(58) Field of Search .................................. 455/421, 422, 455/67.7, 67.1, 88, 575; 340/571

(56) References Cited

U.S. PATENT DOCUMENTS 4,675,656 * 6/1987 Narcisse ............................... 340/539
5,373,548 * 12/1994 McCarthy ............................... 379/63
5,752,166 * 5/1998 Dorenbosch et al. .............. 455/67.1
5,875,185 * 2/1999 Wang et al. .......................... 370/331

* cited by examiner

Primary Examiner—Thanh Cong Le
Assistant Examiner—Meless N. Zewdu
(74) Attorney, Agent, or Firm—DeMont & Breyer, LLC; Jason Paul DeMont; Wayne S. Breyer

(57) ABSTRACT

A technique for preventing the user of a wireless terminal from carrying a wireless terminal into the umbra of a fade is disclosed. In particular, some embodiments of the present invention notify the user that the user is in danger of entering the umbra and assist the user in navigating from the fade. An illustrative embodiment of the present invention comprises: creating a first measurement of signal quality, SQ(n), of a signal received from a wireless terminal; and, when the first measurement of signal quality, SQ(n), is unsatisfactory, transmitting a first message to the wireless terminal to direct a user of the wireless terminal to move the wireless terminal in one direction.

23 Claims, 6 Drawing Sheets

100

PREVENTING WIRELESS TELECOMMUNICATIONS CALLS FROM BEING DISCONNECTED DUE TO LOW SIGNAL QUALITY

FIELD OF THE INVENTION

The present invention relates to telecommunications in general, and, more particularly, to a technique for preventing a wireless telecommunications call from being disconnected due to low signal quality.

BACKGROUND OF THE INVENTION

FIG. 1 depicts a schematic diagram of a portion of a typical wireless telecommunications system, which provides wireless telecommunications service to a number of wireless terminals (e.g., wireless terminals 101-1 through 101-3) that are situated within a geographic region. The heart of a typical wireless telecommunications system is Wireless Switching Center ("MWSC") 120, which may be also known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local- and long-distance telephone offices (e.g., local-office 130, local-office 138 and toll-office 140). Wireless Switching Center 120 is responsible for, among other things, establishing and maintaining calls between wireless terminals and between a wireless terminal and a wireline terminal, which wireline terminal is connected to Wireless Switching Center 120 via the local and/or long-distance networks.

The geographic area serviced by a wireless telecommunications system is divided into spatially distinct areas called "cells." As depicted in FIG. 1, each cell is schematically represented by a hexagon; in practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

When wireless telecommunications system 100 is a terrestrial system, in contrast to a satellite-based system, the quality and availability of service is subject to the idiosyncrasies of the terrain surrounding the system. For example, when the topography of the terrain is hilly or mountainous, or when objects such as buildings or trees are present, a signal transmitted by a base station can be absorbed or reflected such that the signal quality is not uniform throughout the cell. The result is that some areas of the cell might receive little or no signal from the base station because they are in the shadow of a mountain or a building. Alternatively, some areas can receive a direct path signal and one or more reflected signals from the base station such that the signals destructively interfere in accordance with the well-known multipath problem. In either case, for the purposes of this specification, a region of poor signal quality is called a "fade."

FIG. 2 depicts a schematic diagram of cell 102-1 of FIG. 1, which contains base station 1031, wireless terminal 101-1, fade 201-1 and fade 201-2. In general, the shape, intensity and area of a fade is based on terrestrial features.

At the perimeter or "penumbra" of a fade, the signal quality is typically diminished a little such that a call between the wireless terminal and the base station can continue, although generally with either noise or lapses in the conversation. At the interior or "umbra" of the fade, the signal quality is typically so attenuated that the base station and the wireless terminal cannot communicate at all.

When the user of a wireless terminal carries the wireless terminal into the umbra of a fade while engaged in a call, the call is invariably dropped, which annoys the parties to the call and deprives the operator of the wireless telecommunications system of revenue. Therefore, the need exists for a technique for eliminating or ameliorating the effect of a fade, or of preventing the user of a wireless terminal from carrying the wireless terminal into the umbra of a fade while engaged in a call.

SUMMARY OF THE INVENTION

Some embodiments of the present invention prevent the user of a wireless terminal from carrying a wireless terminal into the umbra of a fade without some of the costs and restrictions associated with techniques in the prior art. In particular, some embodiments of the present invention notify the user that the user is in danger of entering the umbra and assist the user in moving away from the fade. Furthermore, some embodiments of the present invention work with existing wireless terminals and without a change to the telecommunications air interface. This fact is particularly advantageous because it enables some embodiments of the present invention to be commercially exploited without changing the millions of wireless terminals already in existence.

Some embodiments of the present invention reside outside of the wireless terminal and estimate when a wireless terminal is in a fade by monitoring at the base station the signal quality of the signal transmitted by the wireless terminal. The is premised on the observation that if the wireless terminal is having difficulty receiving a signal from the base station because it is in a fade, the base station will perceive a similar difficulty in receiving a signal from the wireless terminal. In other words, the signal quality at the wireless terminal is determined not directly by the wireless terminal, but indirectly.

When the signal quality of a signal from the wireless terminal becomes unsatisfactory, which indicates that the wireless terminal has entered a fade, the wireless telecommunications system inserts an audible message into the downlink audio channel that is heard by the user of the wireless terminal. Typically, the message: (1) informs the user that the call is in danger of being dropped because the user has carried the wireless terminal into a region of unsatisfactory signal quality, and (2) directs the user to take remedial measures.

Because some embodiments of the present invention specify neither the absolute direction of movement nor are capable of explicitly determining the direction of movement, some other embodiments of the present invention continually measure the signal quality from the wireless terminal and provide feedback to the user on whether the user's remedial movement is satisfactory, or better but not yet satisfactory, or has made the situation worse. In other words, because some embodiments of the present invention know neither the absolute direction of the user's movement nor the shape of the fade, the illustrative embodiment uses changes in successive signal quality measurements to provide feedback to the user about the efficacy of user's movements to escape the fade.

In other words, some embodiments of the present invention function somewhat analogously, although not identically, to a high-tech version of the children's game Huckel-Buckel-Beanstalk. In Huckel-Buckel-Beanstalk one child, who knows the location of a hidden object, guides a second child, who does not know the location of the hidden object, to the hidden object by continually providing feedback to the second child as the second child moves in search of the object. Traditionally, the first child's feedback is manifested with adjectives normally associated with temperature, such as "colder," "warmer," and "burning up!" When the second child is stationary and far from the hidden object, the first child might say "frigid." As the second child moves towards the hidden object, the first child would provide positive feedback by saying "warmer." If, instead, the second child moves away from the hidden object, the first child would provide negative feedback by saying "colder." Through successive iterations of movement by the second child and feedback by the first child, the second child is progressively given sufficient information to zero-in on the location of the hidden object.

In Huckel-Buckel-Beanstalk, the first child explicitly knows through direct observation the location of the hidden object, the location of the second child, and the second child's absolute direction of movement. In contrast, some embodiments of the present invention know neither the location of a fade, the location of the wireless terminal, nor the absolute direction of movement of the wireless terminal as it is moved by the user. Furthermore, the goal of Huckel-Buckel-Beanstalk is to assist another person in moving towards an object; in contrast, the goal of some embodiments of the present invention is to assist another person in moving away from a region in space (i.e., a fade).

Embodiments of the present invention deduce the distance of the wireless terminal from a fade based on signal quality measurements, and deduce the direction of movement towards or away from a fade based on the changes in successive signal quality measurements. An unsatisfactory signal quality measurement enables an embodiment of the present invention to deduce that a wireless terminal is near a fade and to sound a tocsin. An improvement in successive signal quality measurements enables the embodiment to deduce that the wireless terminal is moving away from the fade and to provide positive feedback to the user, and declining signal quality measurements enable the embodiment to deduce that the wireless terminal is moving toward the fade and to provide negative feedback to the user.

An illustrative embodiment of the present invention comprises: creating a first measurement of signal quality, SQ(n), of a signal received from a wireless terminal; and, when the first measurement of signal quality, SQ(n), is unsatisfactory, transmitting a first message to the wireless terminal to direct a user of the wireless terminal to move the wireless terminal in one direction.

DETAILED DESCRIPTION

Figure 1:
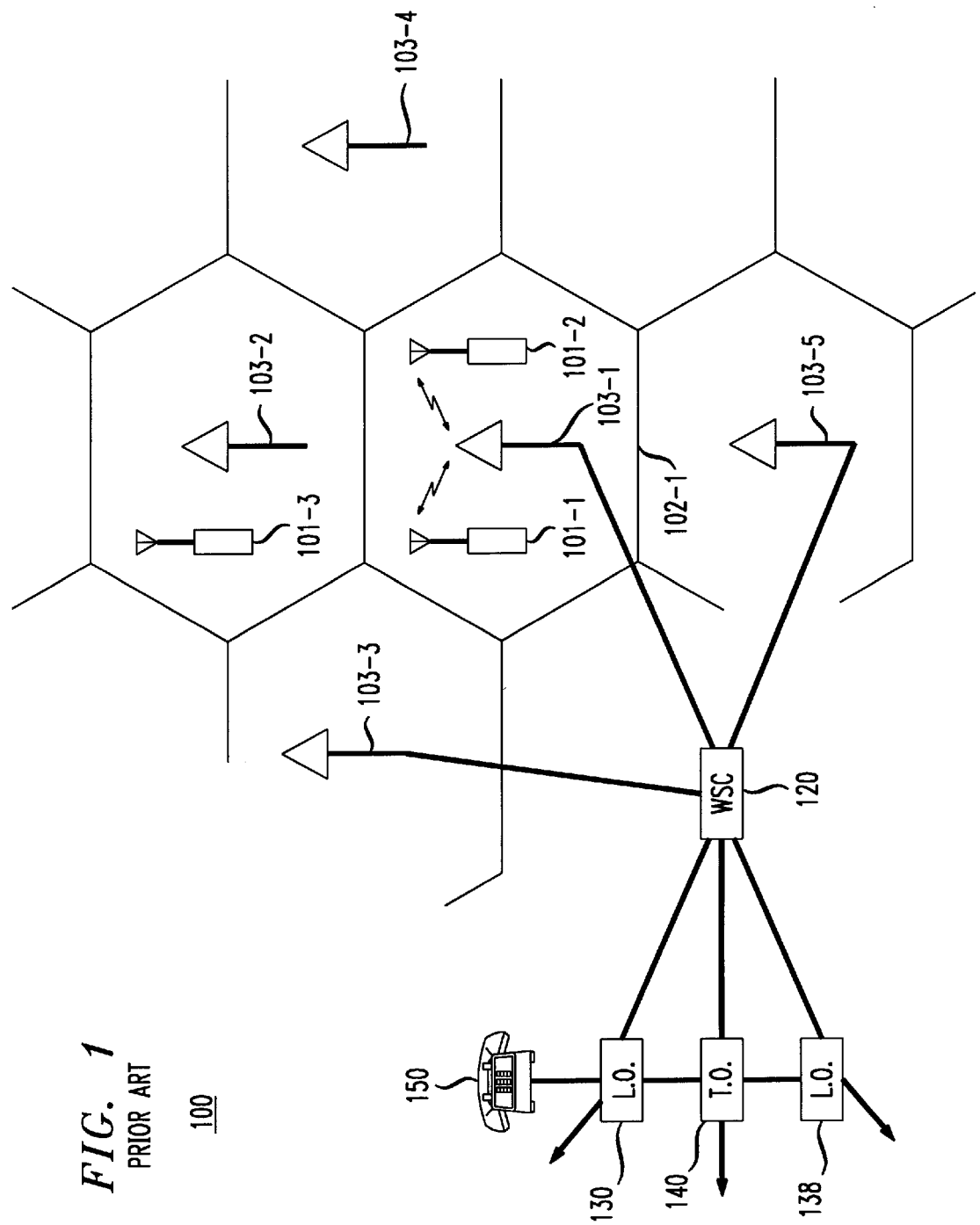
FIG. 1 depicts a schematic diagram of a wireless telecommunications system in the prior art.
Figure 2:
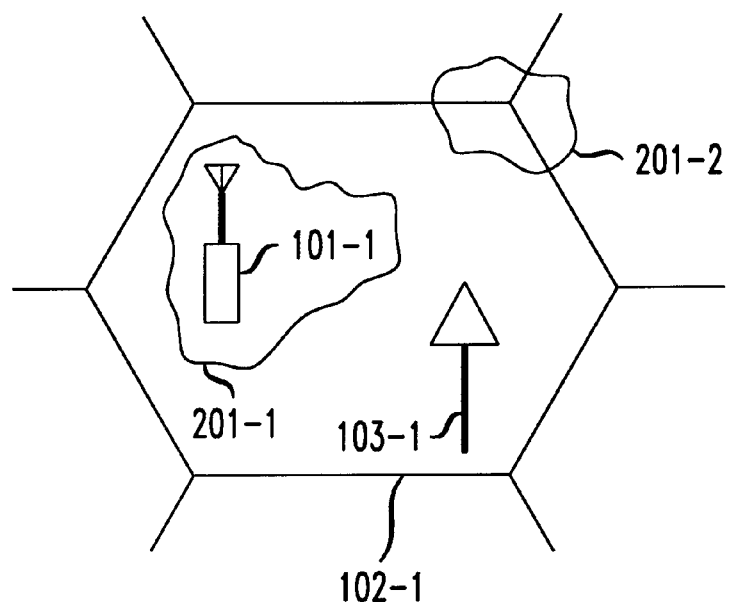
FIG. 2 depicts a schematic diagram of a cell and a plurality of fades within that cell.
Figure 3:
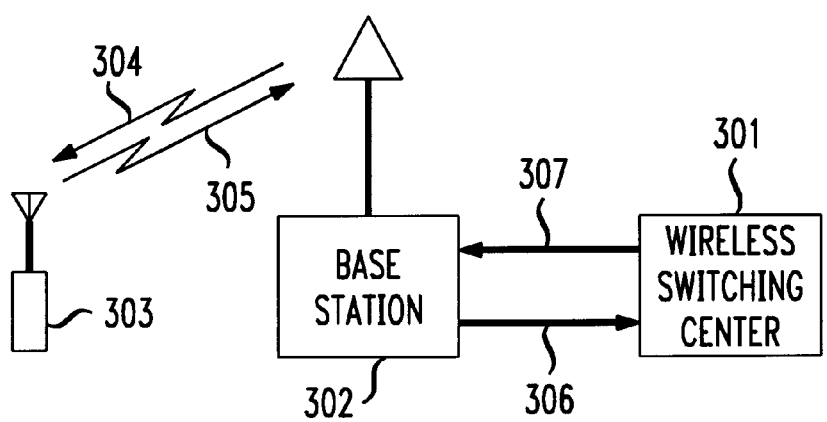
FIG. 3 depicts a block diagram of an illustrative embodiment of the present invention.

FIG. 3 depicts a block diagram of an illustrative embodiment of the present invention, which advantageously comprises: wireless switching center 301, base station 302 and wireless terminal 303. When wireless terminal 303 is engaged in a call, two independent, half-duplex communications channels are established between wireless terminal 303 and base station 302, in well-known fashion. One half-duplex channel carries information from base station 302 to wireless terminal 301 and is called the downlink channel or, alternatively, the forward channel. The second half-duplex channel carries information from wireless terminal 301 to base station 302 and is called the uplink channel or, alternatively, the reverse channel.

The uplink channel received by base station 302 is forwarded to wireless switching center 301 over link 306, in well-known fashion, and the downlink channel is received from wireless switching center 301 over link 307, also in well-known fashion.

Figure 4:
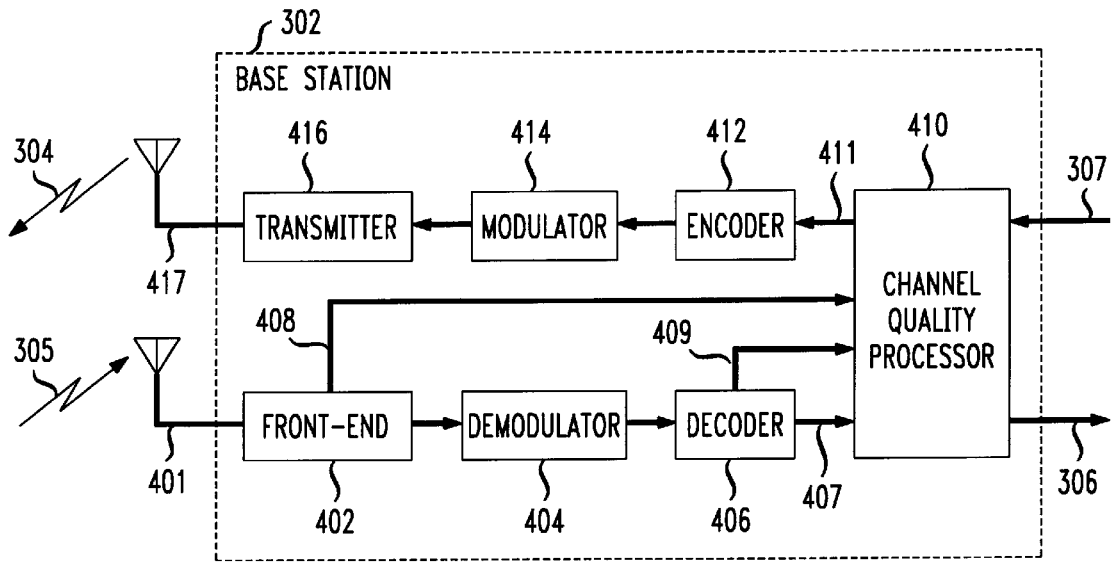
FIG. 4 depicts a block diagram of a base station in accordance with the illustrative embodiment of the present invention.

FIG. 4 depicts a block diagram of base station 302 in accordance with the illustrative embodiment. Base station 302 advantageously comprises: receive antenna 401, front-end 402, demodulator 404, decoder 406, channel quality processor 410, encoder 412, modulator 414, transmitter 416 and transmit antenna 417, interconnected as shown.

Uplink signal 305 is received by receive antenna 401 and processed by front-end 402, which prepares uplink signal 305 for demodulation by demodulator 404, in well-known fashion. Front-end 402 advantageously measures the signal quality of uplink signal 305, in well-known fashion, and sends the resulting measurement to channel quality processor 410 via lead 408. Front-end 402 can measure the signal quality of uplink signal 305 according to any of one or more criteria (e.g., signal-to-noise ratio, absolute power in dBm, etc.). It will be clear to those skilled in the art how to make and use receive antenna 401 and front-end 402.

Demodulator 404 advantageously demodulates uplink signal 305, in well-known fashion, according to the appropriate modulation scheme and provides the demodulated uplink signal to decoder 406. Decoder 406 advantageously decodes the uplink signal, in well-known fashion, and provides the decoded uplink signal to channel quality processor 410 on lead 407. Decoder 406 also advantageously determines a measurement of signal quality of uplink signal 305 based on the error rate of the decoded uplink signal and provides that measurement to channel quality processor 410 on lead 409. For example, when wireless terminal 303 and base station 302 are IS-95A CDMA compliant, the measurement of signal quality from decoder 409 is advantageously based on the frame error rate of the signal. It will be clear to those skilled in the art how to make and use demodulator 404 and decoder 406.

Channel quality processor 410 advantageously receives: (1) the measurement of signal quality on lead 408, (2) the measurement of signal quality on lead 406, (3) the decoded uplink signal on lead 407, and (4) the downlink signal from wireless switching center 310 on lead 307, and outputs: (1) an occasionally modified downlink signal to encoder 412, and (2) an occasionally modified uplink signal to wireless switching center 301 on lead 306. Channel quality processor 410 will be described in detail below.

The downlink signal from channel quality processor 410 is successively provided to encoder 412, modulator 414, transmitter 416 and transmit antenna 417, in well-known fashion, for transmission to wireless terminal 303.

Figure 5:
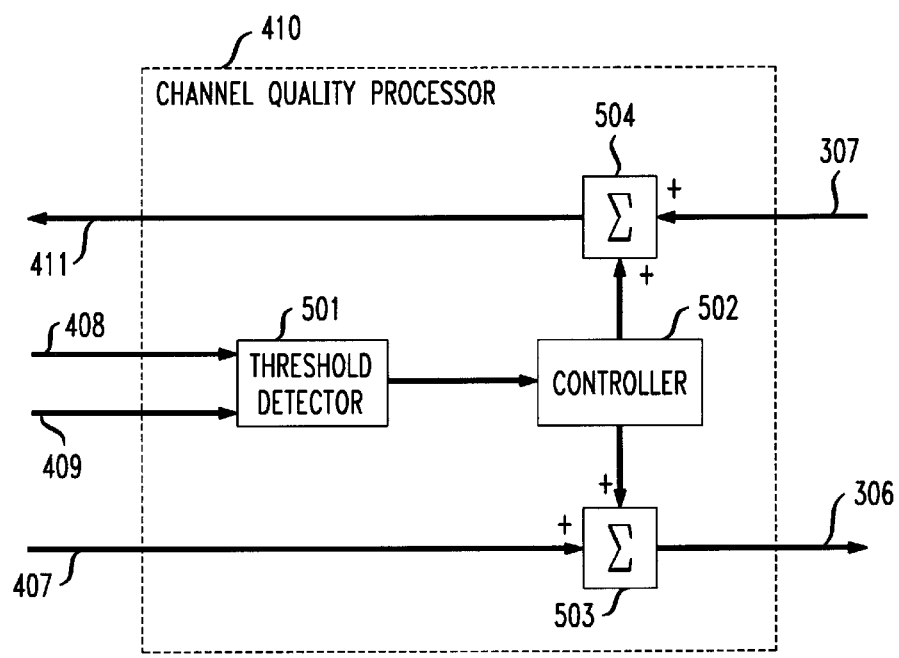
FIG. 5 depicts a block diagram of a channel quality processor in accordance with the base station of FIG. 4.

FIG. 5 depicts a block diagram of channel quality processor 410, which advantageously comprises: threshold detector 501, controller 502, summer 503 and summer 504. Threshold detector 501 advantageously receives both: (1) the measurement of signal quality on lead 408, and (2) the measurement of signal quality on lead 406 and uses one or both measures to create a quantitative measurement of signal quality, SQ(n), of uplink signal 305. Threshold detector 501 advantageously passes the measurement of signal quality, SQ(n), to controller 502. It will be clear to those skilled in the art how to make threshold detector 501.

Figure 6:
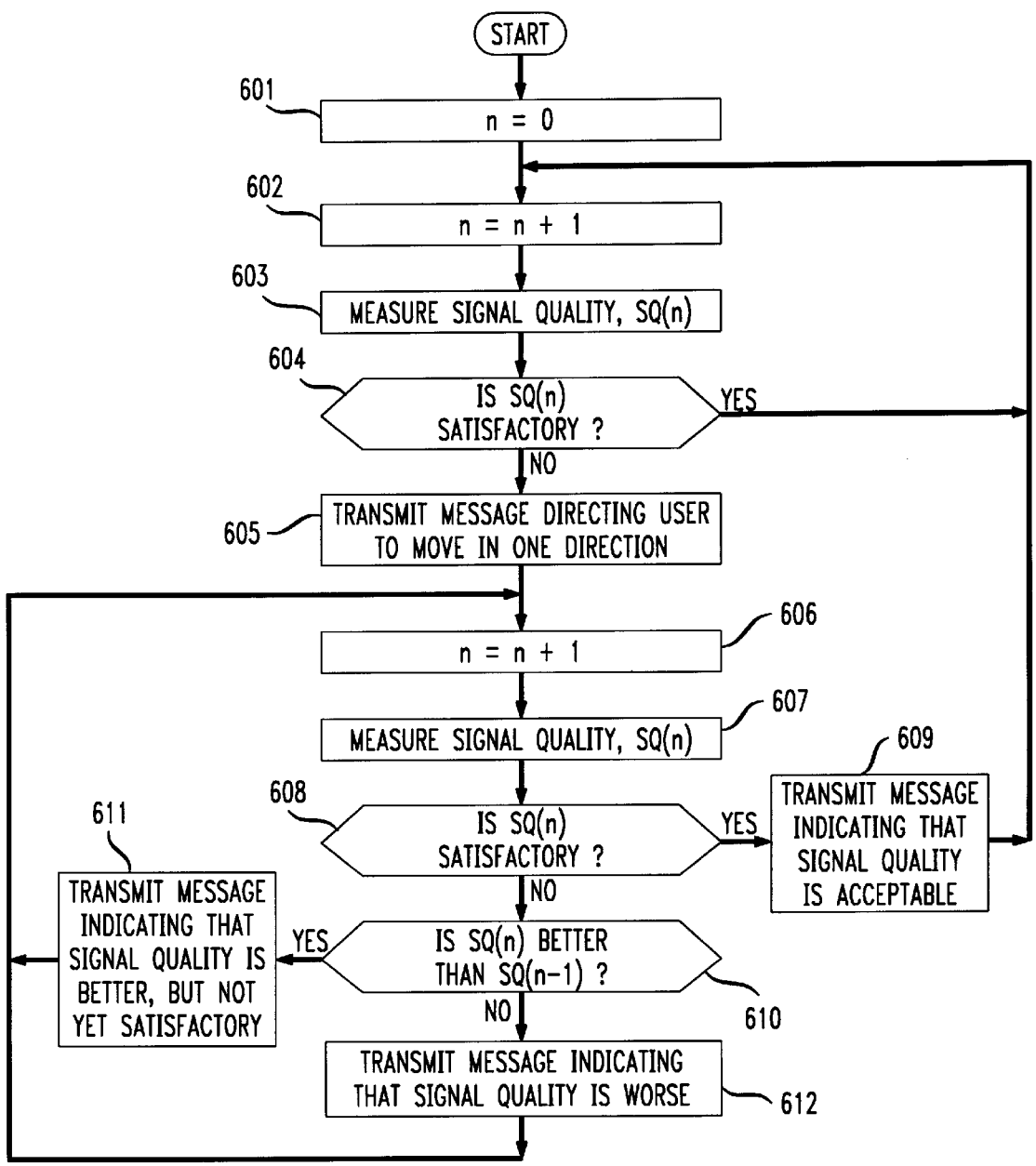
FIG. 6. Depicts a flowchart that illustrates the operation of the illustrative channel quality processor of FIG. 5.
Figure 7:
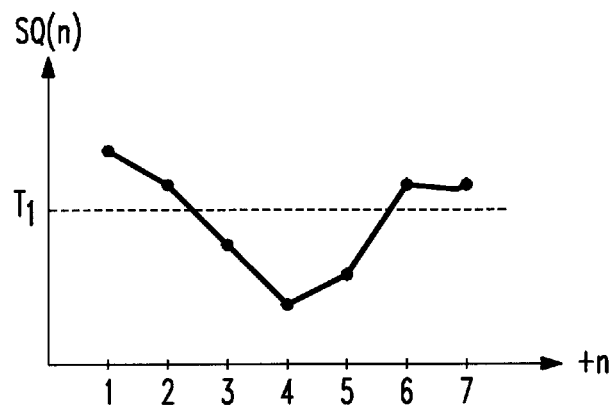
FIG. 7 depicts a graph of signal quality as a function of measurement cycle for an illustrative signal.

Controller 502 is advantageously an appropriately-programmed general-purpose processor or a hardwired special-purpose processor and the operation of controller 502 is most clearly understood in conjunction with the flowchart depicted in FIG. 6 and the illustrative graph of signal quality in FIG. 7.

At step 601, controller 502 advantageously resets a counter, n, to zero at the beginning of each call with wireless terminal 303.

At step 602, controller 502 advantageously increments the counter, n, by one to n=1.

At step 603, controller 502 receives a measurement of signal quality, SQ(1), of the uplink signal received from wireless terminal 303, with the assistance of threshold detector 501, as described above.

FIG. 7 depicts an illustrative graph of the signal quality, SQ(n), of the uplink signal as a function of the counter n. Typically, the signal quality of the uplink signal fluctuates as the user of wireless terminal 303 moves about.

At step 604, controller 502 determines if the current measurement of signal quality, SQ(n), is satisfactory, which suggests that wireless terminal 303 is not in a fade. In accordance with the illustrative embodiment, when a measurement of signal quality, SQ(n), is above the threshold, $T_1$, the signal quality is deemed satisfactory and controller 502 estimates that wireless terminal 303 is not in a fade. When the measurement of signal quality, SQ(n), is deemed satisfactory, control passes to step 602. In contrast, when the measurement of signal quality, SQ(n), is deemed unsatisfactory (i.e., when SQ(n) is less than $T_1$), control passes to step 605. Because it can be seen from the graph in FIG. 7 that SQ(1) is above a threshold, $T_1$, control passes to step 602.

Typically, a value for $T_1$ is established that is that indicative of the penumbra of a fade—the theory being that if it can be detected that the wireless terminal is in the penumbra before it enters the umbra, the communications channels are still functioning and remedial measures can still be taken. In contrast, if a value for Tj is established that is too low, the wireless terminal will enter the umbra and communications will fail before the opportunity for remedial action is possible.

At step 602, controller 502 advantageously increments the counter, n, by one to n=2.

At step 603, controller 502 receives a measurement of signal quality, SQ(2), of the uplink signal received from wireless terminal 303, with the assistance of threshold detector 501, as described above.

At step 604, controller 502 determines if the current measurement of signal quality, SQ(2), is satisfactory. Because it can be seen from the graph in FIG. 7 that SQ(2) is above the threshold, $T_1$, control again passes to step 602.

At step 602, controller 502 advantageously increments the counter, n, by one to n=3.

At step 603, controller 502 receives a measurement of signal quality, SQ(3), of the uplink signal received from wireless terminal 303, with the assistance of threshold detector 501, as described above.

At step 604, controller 502 determines if the current measurement of signal quality, SQ(3), is satisfactory. Because it can be seen from the graph in FIG. 7 that SQ(3) is not above the threshold, $T_1$, control passes to step 605, which suggests that wireless terminal 303 has entered a fade. Although the measurement of signal quality, SQ(3), is below $T_1$, the fact that it can be measured at all suggests that wireless terminal 303 is in the penumbra of a fade and not totally in the throes of the umbra.

At step 605, controller 502 advantageously generates a first message that: (1) indicates that wireless terminal 303 has entered a fade and that the call is in danger of being dropped, and (2) directs the user of wireless terminal 303 to move a short distance in one direction, preferably the direction from which the user just came. The first message is advantageously a pre-recorded or synthesized audible message that is perceivable and understandable by the user of wireless terminal 303. Controller 502 then outputs the message to summer 504 where it is advantageously inserted, in well-known fashion, into the downlink audio channel that is being transmitted to wireless terminal 303.

Alternatively, the message is a control message that that: (1) indicates that wireless terminal 303 has entered a fade and that the call is in danger of being dropped, and (2) directs the user of wireless terminal 303 to move a short distance in one direction, preferably the direction from which the user just came. In this case, controller 502 outputs the message to summer 504 wherein summer 504 inserts the control message into the downlink control message stream, in well-known fashion. Clearly, when the message is in the form of an audible message that is inserted into the downlink audio channel, the illustrative embodiment functions with existing wireless terminals and extant telecommunications air interface standards. In contrast, when the message is in the form of a control message that is inserted into the downlink control message stream, a wireless terminal, such as that depicted in FIG. 8 or FIG. 9 must be employed, and the air interface must be amended accordingly. The wireless terminals in FIG. 8 and FIG. 9 will be described in detail below.

Simultaneously, controller 502 advantageously generates a second message that indicates that: (1) wireless terminal 303 has entered a fade and that the call is in danger of being dropped, and (2) the user of wireless terminal 303 may be temporarily distracted from the conversation pending action to prevent the call from being dropped. Advantageously, the second message is advantageously a pre-recorded or synthesized audible message that is perceivable and understandable by a human. Controller 502 then outputs the second message to summer 503 where it is advantageously inserted, in well-known fashion, into the uplink audio channel that is being transmitted to wireless switching center 301 on lead 306. From step 605, control passes to step 606.

At step 606, controller 502 advantageously increments the counter, n, by one to n=4.

At step 607, controller 502 receives a measurement of signal quality, SQ(4), of the uplink signal received from wireless terminal 303, with the assistance of threshold detector 501, as described above. Advantageously, the measurement of signal quality, SQ(4), is delayed until the user of wireless terminal 303 has received the most recently transmitted message and has had an opportunity to move.

At step 608, controller 502 determines if the current measurement of signal quality, SQ(4), is satisfactory. Because it can be seen from the graph in FIG. 7 that SQ(4) is not above the threshold, $T_1$, control passes to step 610.

At step 610, controller 502 determines if the current measurement of signal quality, SQ(4), is better than the previous measurement of signal quality, SQ(3). If it is, which indicates that the signal quality is still unsatisfactory but that the user's movement helped, then control passes to step 611. If the test fails, which indicates that the user's movement actually hurt the signal quality, then control passes to step 612. Because SQ(4) is less than SQ(3), control passes to step 612.

At step 612, controller 502 advantageously generates a message that: (1) indicates that the user's movement to improve the signal quality actually hurt the signal quality, and (2) directs the user of wireless terminal 303 to move a short distance in the direction opposite just moved. The message is advantageously a pre-recorded or synthesized audible message that is perceivable and understandable by the user of wireless terminal 303. Controller 502 then outputs the message to summer 504 where it is advantageously inserted, in well-known fashion, into the downlink audio channel that is being transmitted to wireless terminal 303.

Alternatively, the message is a control message that that: (1) indicates that the user's movement to improve the signal quality actually hurt the signal quality, and (2) directs the user of wireless terminal 303 to move a short distance in the direction opposite just moved. In this case, controller 502 outputs the message to summer 504 wherein summer 504 inserts the control message into the downlink control message stream, in well-known fashion. After step 612, control passes to step 606.

At step 606, controller 502 advantageously increments the counter, n, by one to n=5.

At step 607, controller 502 receives a measurement of signal quality, SQ(5), of the uplink signal received from wireless terminal 303, with the assistance of threshold detector 501, as described above. Advantageously, the measurement of signal quality, SQ(5), is delayed until the user of wireless terminal 303 has received the most recently transmitted message and has had an opportunity to move.

At step 608, controller 502 determines if the current measurement of signal quality, SQ(5), is satisfactory. Because it can be seen from the graph in FIG. 7 that SQ(5) is not above the threshold, $T_1$, control passes to step 610.

At step 610, controller 502 determines if the current measurement of signal quality, SQ(5), is better than the previous measurement of signal quality, SQ(4). Because SQ(5) is better than SQ(4), control passes to step 611.

At step 611, controller 502 advantageously generates a message that: (1) indicates that the user's movement to improve the signal quality helped but is not sufficient, and (2) directs the user of wireless terminal 303 to move a short distance further in the direction just moved. The message is advantageously a pre-recorded or synthesized audible message that is perceivable and understandable by the user of wireless terminal 303. Controller 502 then outputs the message to summer 504 where it is advantageously inserted, in well-known fashion, into the downlink audio channel that is being transmitted to wireless terminal 303.

Alternatively, the message is a control message that that: (1) indicates that the user's movement to improve the signal quality helped but is not sufficient, and (2) directs the user of wireless terminal 303 to move a short distance further in the direction just moved. In this case, controller 502 outputs the message to summer 504 wherein summer 504 inserts the control message into the downlink control message stream, in well-known fashion. After step 611, control passes to step 606.

At step 606, controller 502 advantageously increments the counter, n, by one to n=6.

At step 607, controller 502 receives a measurement of signal quality, SQ(6), of the uplink signal received from wireless terminal 303, with the assistance of threshold detector 501, as described above. Advantageously, the measurement of signal quality, SQ(6), is delayed until the user of wireless terminal 303 has received the most recently transmitted message and has had an opportunity to move.

At step 608, controller 502 determines if the current measurement of signal quality, SQ(5), is satisfactory. Because it can be seen from the graph in FIG. 7 that SQ(6) is above the threshold, $T_1$, control passes to step 609.

At step 609, controller 502 advantageously generates a message that indicates that wireless terminal 303 has exited the fade and that the call is no longer in danger of being dropped. The message is advantageously a pre-recorded or synthesized audible message that is perceivable and understandable by the user of wireless terminal 303. Controller 502 then outputs the message to summer 504 where it is advantageously inserted, in well-known fashion, into the downlink audio channel that is being transmitted to wireless terminal 303.

Alternatively, the message is a control message that that indicates that wireless terminal 303 has exited the fade and that the call is no longer in danger of being dropped. In this case, controller 502 outputs the message to summer 504 wherein summer 504 inserts the control message into the downlink control message stream, in well-known fashion.

Simultaneously, controller 502 advantageously generates a second message that indicates that indicates that wireless terminal 303 has exited the fade and that the call is no longer in danger of being dropped. Advantageously, the second message is advantageously a pre-recorded or synthesized audible message that is perceivable and understandable by a human. Controller 502 then outputs the second message to summer 503 where it is advantageously inserted, in well-known fashion, into the uplink audio channel that is being transmitted to wireless switching center 301 on lead 306. From step 609, control passes to step 606.

At step 606, controller 502 advantageously increments the counter, n, by one to n=6, and the process continues until the call is terminated by the parties to the call. It will be clear to those skilled in the art how to make and use base station 302 and channel quality processor 410.

Returning to FIG. 5, summer 503 and summer 504 are capable of receiving audible messages or control messages or both from controller 502 and of inserting them into the appropriate audio channel or control message stream, respectively. It will be clear to those skilled in the art how to make and use base station 302 and channel quality processor 410.

Figure 8:
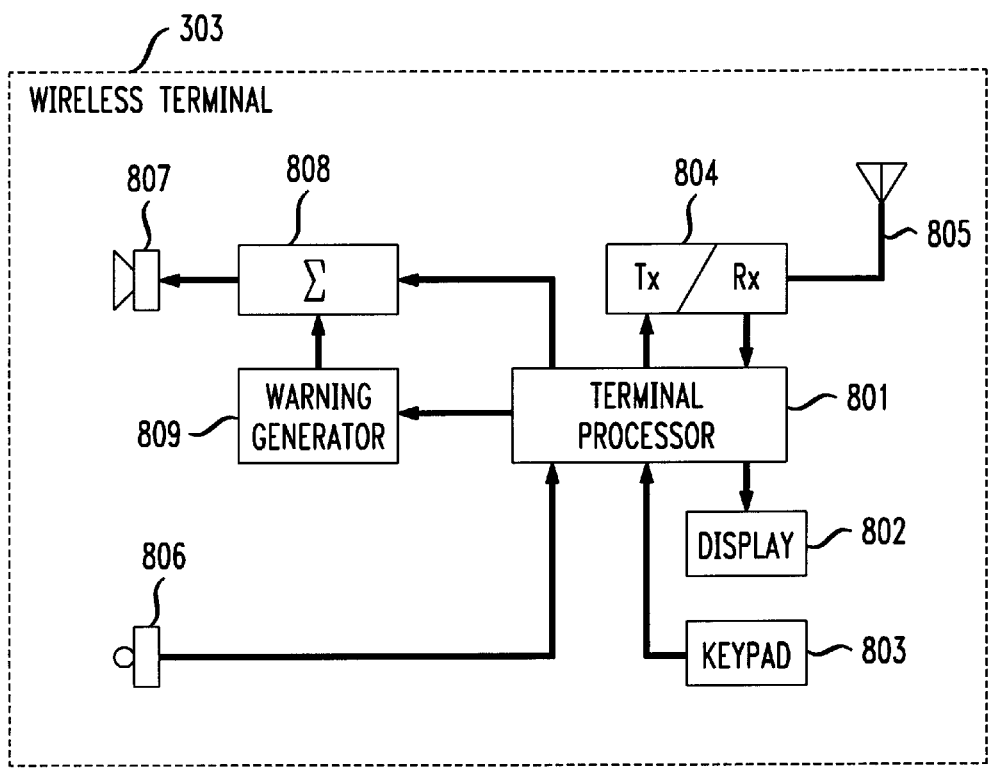
FIG. 8 depicts a block diagram of an illustrative wireless terminal in accordance with one embodiment of the present invention.

FIG. 8 depicts a block diagram of a first illustrative embodiment of wireless terminal 303 that accepts control messages transmitted by base station 302 in the downlink control message stream and that generates and outputs pre-recorded or synthesized audible messages that are perceivable and understandable by the user of wireless terminal 303. Wireless terminal 303 advantageously comprises: terminal processor 801, display 802, keypad 803, transceiver 804, antenna 805, microphone 806, speaker 807, summer 808 and warning generator 809.

Terminal processor 801, display 802, keypad 803, transceiver 804, antenna 805, microphone 806 and speaker 807 are all made and used in well-known fashion. Terminal processor 801 is advantageously an appropriately-programmed general-purpose computer or hardwired special-purpose computer that is capable of detecting control messages in the downstream control message stream and of transmitting an indicium of those control messages to warning generator 809. Advantageously, warning generator 809 is capable of receiving four different messages and of outputting to summer 808 pre-recorded or synthesized audible messages that are perceivable and understandable by the user of wireless terminal 303.

The first message is generated by the control message transmitted in step 605 and: (1) indicates that wireless terminal 303 has entered a fade and that the call is in danger of being dropped, and (2) directs the user of wireless terminal 303 to move a short distance in one direction, preferably the direction from which the user just came.

The second message is generated by the control message transmitted in step 609 and indicates that wireless terminal 303 has exited the fade and that the call is no longer in danger of being dropped.

The third message is generated by the control message transmitted in step 611 and: (1) indicates that the user's movement to improve the signal quality helped but is not sufficient, and (2) directs the user of wireless terminal 303 to move a short distance further in the direction just moved.

The fourth message is generated by the control message transmitted in step 612 and: (1) indicates that the user's movement to improve the signal quality actually hurt the signal quality, and (2) directs the user of wireless terminal 303 to move a short distance in the direction opposite just moved.

Summer 808 inserts the audible message output from warning generator 809 into signal output through microphone 807. It will be clear to those skilled in the art how to make wireless terminal 303 in accordance with the illustrative embodiment in FIG. 8.

It will be clear to those skilled in the art that a signal quality meter in wireless terminal 303 can make the necessary signal quality measurements needed to ascertain when wireless terminal 303 is in a fade, or leaving a fade, or going further into the fade and that warning generator 809 can be driven my the internal signal quality meter rather than by control messages from the base station. In other words, it will be clear to those skilled in the art how to make and use wireless terminals in accordance with the present invention that are entirely self-contained in terms of measuring signal quality and providing warnings and feedback to the user and without assistance from a base station or other wireless telecommunications infrastructure.

Figure 9:
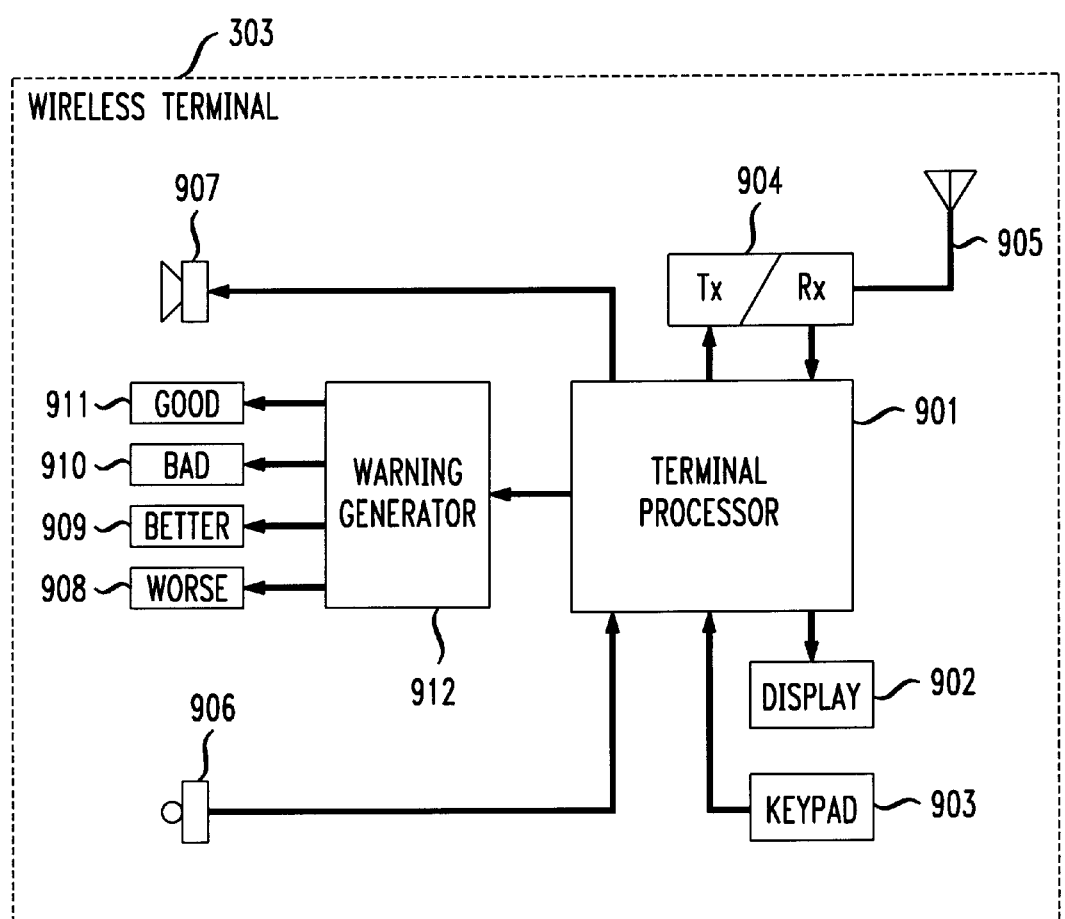
FIG. 9 depicts a block diagram of an illustrative wireless terminal in accordance with a second embodiment of the present invention.

FIG. 9 depicts a block diagram of a first illustrative embodiment of wireless terminal 303 that accepts control messages transmitted by base station 302 in the downlink control message stream and that generates and outputs pre-recorded or synthesized audible messages that are perceivable and understandable by the user of wireless terminal 303. Wireless terminal 303 advantageously comprises: terminal processor 901, display 902, keypad 903, transceiver 904, antenna 905, microphone 906, speaker 907, visual indicator 908, visual indicator 909, visual indicator 910, visual indicator 911 and warning generator 912.

Terminal processor 901, display 902, keypad 903, transceiver 904, antenna 905, microphone 906 and speaker 907 are all made and used in well-known fashion. Terminal processor 901 is advantageously capable of detecting control messages in the downstream control message stream and of transmitting an indicium of those control messages to warning generator 912. Advantageously, warning generator 912 is capable of receiving four different messages and of illuminating visual indicator 908, visual indicator 909, visual indicator 910 and/or visual indicator 911, in accordance with each of the four control message. Each of visual indicator 908, visual indicator 909, visual indicator 910 and visual indicator 911 are illustratively light-emitting diodes ("LEDs").

The first message is generated by the control message transmitted in step 605 and: (1) indicates that wireless terminal 303 has entered a fade and that the call is in danger of being dropped, and (2) directs the user of wireless terminal 303 to move a short distance in one direction, preferably the direction from which the user just came.

The second message is generated by the control message transmitted in step 609 and indicates that wireless terminal 303 has exited the fade and that the call is no longer in danger of being dropped.

The third message is generated by the control message transmitted in step 611 and: (1) indicates that the user's movement to improve the signal quality helped but is not sufficient, and (2) directs the user of wireless terminal 303 to move a short distance further in the direction just moved.

The fourth message is generated by the control message transmitted in step 612 and: (1) indicates that the user's movement to improve the signal quality actually hurt the signal quality, and (2) directs the user of wireless terminal 303 to move a short distance in the direction opposite just moved.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
   creating a first measurement of signal quality, SQ(n), of a signal received from a wireless terminal:
   transmitting a first message to said wireless terminal to direct a user of said wireless terminal to move said wireless terminal in one direction when said first measurement of signal quality, SQ(n), is unsatisfactory;

creating a second measurement of signal quality, SQ(n+1), of said signal received from said wireless terminal after transmitting said first message; and transmitting a second message to said wireless terminal to direct said user of said wireless terminal to move said wireless terminal further in said one direction when said second measurement of signal quality, SQ(n+1), is better than said first measurement of signal quality, SQ(n), and said second measurement of signal quality, SQ(n+1), is still unsatisfactory.

2. The method of claim 1 wherein said step of transmitting a second message comprises the step of inserting an audible message into the downlink audio channel transmitted to said wireless terminal.

3. The method of claim 1 wherein said second message is a control message to direct said wireless terminal to direct said user of said wireless terminal to move said wireless terminal further in said one direction.

4. A method comprising:

creating a first measurement of signal quality, SQ(n), of a signal received from a wireless terminal;

transmitting a first message to said wireless terminal to direct a user of said wireless terminal to move said wireless terminal in one direction when said first measurement of signal quality, SQ(n), is unsatisfactory;

creating a second measurement of signal quality, SQ(n+1), of said signal received from said wireless terminal after transmitting said first message; and transmitting a second message to said wireless terminal to direct said user of said wireless terminal to move said wireless terminal opposite said one direction when said second measurement of signal quality, SQ(n+1), is worse than said first measurement of signal quality, SQ(n).

5. The method of claim 4 wherein said step of transmitting a second message comprises the step of inserting an audible message into the downlink audio channel transmitted to said wireless terminal.

6. The method of claim 4 wherein said second message is a control message to direct said wireless terminal to direct said user of said wireless terminal to move said wireless terminal opposite said one direction.

7. A method comprising:

creating a first measurement of signal quality, SQ(n), of a signal received from a wireless terminal;

transmitting a first message to said wireless terminal to direct a user of said wireless terminal to move said wireless terminal in one direction when said first measurement of signal quality, SQ(n), is unsatisfactory;

creating a second measurement of signal quality, SQ(n+1), of said signal received from said wireless terminal after transmitting said first message; and transmitting a second message to said wireless terminal indicating to said user of said wireless terminal that said second measurement of signal quality, SQ(n+1), is satisfactory when said first measurement of signal quality, SQ(n), is satisfactory.

8. The method of claim 7 wherein said step of transmitting a second message comprises the step of inserting an audible message into the downlink audio channel transmitted to said wireless terminal.

9. The method of claim 7 wherein said second message is a control message to direct said wireless terminal to indicate to said user of said wireless terminal that said second measurement of signal quality, SQ(n+1), is satisfactory.

10. An apparatus comprising:

a threshold detector for creating a first measurement of signal quality, SQ(n), of a signal received from a wireless terminal and a second measurement of signal quality, SQ(n+1), of said signal received from said wireless terminal; and a warning generator for generating a first message for said wireless terminal to direct a user of said wireless terminal to move said wireless terminal in one direction when said first measurement of signal quality, SQ(n), is unsatisfactory and for generating a second message for said wireless terminal to direct said user of said wireless terminal to move said wireless terminal further in said one direction when both said second measurement of signal quality, SQ(n+1), is better than said first measurement of signal quality, SQ(n), and said second measurement of signal quality, SQ(n+1), is unsatisfactory.

11. The apparatus of claim 10 wherein said warning generator inserts an audible message into a downlink audio channel transmitted to said wireless terminal.

12. The apparatus of claim 10 wherein said second message is a control message to direct said wireless terminal to direct said user of said wireless terminal to move said wireless terminal further in said one direction.

13. An apparatus comprising:

a threshold detector for creating a first measurement of signal quality, SQ(n), of a signal received from a wireless terminal and a second measurement of signal quality, SQ(n+1), of said signal received from said wireless terminal; and a warning generator for generating a first message for said wireless terminal to direct a user of said wireless terminal to move said wireless terminal in one direction when said first measurement of signal quality, SQ(n), is unsatisfactory and for generating a second message for said wireless terminal to direct said user of said wireless terminal to move said wireless terminal opposite said one direction when said second measurement of signal quality, SQ(n+1), is worse than said first measurement of signal quality, SQ(n).

14. The apparatus of claim 13 wherein said warning generator inserts an audible message into a downlink audio channel transmitted to said wireless terminal.

15. The apparatus of claim 13 wherein said second message is a control message to direct said wireless terminal to direct said user of said wireless terminal to move said wireless terminal opposite said one direction.

16. An apparatus comprising:

a threshold detector for creating a first measurement of signal quality, SQ(n), of a signal received from a wireless terminal and second measurement of signal quality, SQ(n+1), of said signal received from said wireless terminal; and a warning generator for generating a first message for said wireless terminal to direct a user of said wireless terminal to move said wireless terminal in one direction when said first measurement of signal quality, SQ(n), is unsatisfactory and for generating a second message for said wireless terminal indicating to said user of said wireless terminal to move said wireless terminal opposite said one direction when said second measurement of signal quality, SQ(n+1), is worse than said first measurement of signal quality, SQ(n).

17. The apparatus of claim 16 wherein said warning generator inserts an audible message into a downlink audio channel transmitted to said wireless terminal.

18. The apparatus of claim 16 wherein said second message is a control message to direct said wireless terminal to indicate to said user of said wireless terminal that said second measurement of signal quality, SQ(n+1), is satisfactory.

19. A wireless terminal comprising:

a wireless receiver for receiving a downlink signal;

a terminal processor for extracting a first message and a second message from said downlink signal; and a warning generator for directing a user of said wireless terminal to move said wireless terminal in one direction when said first message is a control message directing said wireless terminal to direct said user of said wireless terminal to move said wireless terminal in said one direction, and for directing said user of said wireless terminal to move said wireless terminal opposite said one direction when said second message is a control message directing said wireless terminal to direct said user of said wireless terminal to move said wireless terminal opposite said one direction.

20. The wireless terminal of claim 19 further comprising a speaker and wherein said warning generator inserts an audible message output via said speaker that directs said user of said wireless terminal to move said wireless terminal in said one direction.

21. The wireless terminal of claim 19 wherein said terminal processor extracts a second message from downlink signal; and wherein said warning generator directs said user of said wireless terminal to move said wireless terminal further in said one direction when said second message is a control message directing said wireless terminal to direct said user of said wireless terminal to move said wireless terminal further in said one direction.

22. The wireless terminal of claim 21 further comprising a speaker and wherein said warning generator inserts an audible message output via said speaker that directs said user of said wireless terminal to move said wireless terminal in said one direction.

23. The wireless terminal of claim 19 further comprising a speaker and wherein said warning generator inserts an audible message output via said speaker that directs said user of said wireless terminal to move said wireless terminal opposite said one direction.

\* \* \* \* \*